United States Patent
DeKoning (10) Patent No.: US 6,304,942 B1
(45) Date of Patent: Oct. 16, 2001

(54) PROVIDING AN UPGRADE PATH FOR AN EXISTING DATA STORAGE SYSTEM

(75) Inventor: Rodney Allen DeKoning, August, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/370,564

(22) Filed: Aug. 9, 1999

(51) Int. Cl.$^7$ .................................................. G06F 12/02
(52) U.S. Cl. .......................... 711/114; 714/6; 711/170
(58) Field of Search .................................. 711/114, 161, 711/162, 165, 170, 171, 172; 714/6; 707/204

(56) References Cited

U.S. PATENT DOCUMENTS

| | | | |
|---|---|---|---|
| 5,454,085 | * 9/1995 | Gajjar et al. | 711/114 |
| 5,504,882 | * 4/1996 | Chai et al. | 711/100 |
| 5,617,425 | * 4/1997 | Anderson | 714/6 |
| 5,890,214 | * 3/1999 | Espy et al. | 711/114 |

* cited by examiner

Primary Examiner—Hiep T. Nguyen (57) ABSTRACT

A system and method upgrade an original data storage system into an enhanced data storage system. The original data storage system includes an original storage array controller device and an original storage array. The original data storage system is initially connected to a host system via a host bus and presents to the host system an original logical volume mapping associated with a logical identifier and mapped to a physical data set stored in individual storage devices in the original storage array. An enhanced storage array controller device is operatively connected to the host system via the host bus, and the original storage array controller device and a storage connection device coupled to another storage array are operatively connecting to the enhanced storage array controller device via an intermediate bus. The physical data set of the original storage array is redistributed across a plurality of storage arrays, including the original and the other storage arrays. The enhanced storage array controller device is reconfigured to present to the host system a logical volume mapping associated with the logical identifier mapping to the physical data set redistributed across the plurality of storage arrays.

19 Claims, 7 Drawing Sheets

PROVIDING AN UPGRADE PATH FOR AN EXISTING DATA STORAGE SYSTEM

TECHNICAL FIELD

The present application relates generally to data storage systems and more particularly to adding storage capacity, performance, and/or functionality to an existing data storage system.

BACKGROUND OF THE INVENTION

Host computer systems often connect to one or more storage controllers that provide access to an array of storage devices. In a common storage controller, microprocessors communicate the data between the storage array and the host computer system. The host system addresses a "volume" of stored data through the storage controller using a logical identifier, such as Logical Unit Number (LUN) used in SCSI (Small Computer System Interface) subsystems. The term "volume" is often used as a synonym for all or part of a particular storage disk, but it also describes a virtual disk that spans more than one disk. In the latter case, the virtual disk presents a single, contiguous logical volume to the host system, regardless of the physical location of the data in the array. For example, a single volume can represent logically contiguous data elements striped across multiple disks. A file structure can also be embedded on top of a volume to provide remote access thereto, such as Network File System (NFS) designed by Sun Microsystems, Inc. and the Common Internet File System (CIFS) protocol built into Microsoft WINDOWS products and other popular operating systems.

Storage controllers come in many flavors. Some storage controllers provide RAID (Redundant Array of Independent Disks) functionality for a combination of improved fault tolerance and performance. In RAID storage controllers on an SCSI bus, for example, the host system addresses a storage element by providing the single SCSI Target ID of the RAID storage controller and the LUN of the desired logical volume. A LUN is commonly a three-bit identifier used on a SCSI connection to distinguish between up to eight devices (logical units) having the same SCSI Target ID. Currently, SCSI also supports LUNs up to 64-bits. The RAID storage controller corresponding to the provided SCSI Target ID translates the LUN into the physical address of the requested storage element within the attached storage array.

A volume ID is another form of logical identifier. Volume IDs are typically 64-bit or 128-bit globally unique persistent world wide names that correspond directly to LUNs or identifiers for other storage representations. By providing a mapping to LUNs, volume ID's can be remapped if there is a collision between LUNs in a storage system, so as to present a set of unique volume IDs to a host accessing the storage system.

The term "RAID" was introduced in a paper entitled "A Case for Redundant Arrays of Inexpensive Disks (RAID)", Patterson et al., Proc. ACM SIGMOD, June 1988, in which five disk array architectures were described under the acronym "RAID". A RAID 1 architecture provides "mirroring" functionality. In other words, the data for each volume of a primary storage unit is duplicated on a secondary ("mirrored") storage unit, so as to provide access to the data on the secondary storage unit in case the primary storage unit becomes inoperable or is damaged.

A RAID 2 architecture provides error detection and correction ("EDC") functionality. For example, in U.S. Pat. No. 4,722,085 to Flora et al., seven EDC bits are added to each 32-bit data word to provide error detection and error correction capabilities. Each bit in the resultant 39-bit word is written to an individual disk drive (requiring at least 39 separate disk drives to store a single 32-bit data word). If one of the individual drives fails, the remaining 38 valid bits can be used to construct each 32-bit data word, thereby achieving fault tolerance.

A RAID 3 architecture provides fault tolerance using parity-based error correction. A separate, redundant storage unit is used to store parity information generated from each data word stored across N data storage units. The N data storage units and the parity unit are referred to as an "N+1 redundancy group" or "drive group". If one of the data storage units fails, the data on the redundant unit can be used in combination with the remaining data storage units to reconstruct the data on the failed data storage unit.

A RAID 4 architecture provides parity-based error correction similar to a RAID 3 architecture but with improved performance resulting from "disk striping". In disk striping, a redundancy group is divided into a plurality of equally sized address areas referred to as blocks. Blocks from each storage unit in a redundancy group having the same unit address ranges are referred to as "stripes". Each stripe has N blocks of data of different storage devices plus one parity block on another, redundant storage device, which contains parity for the N data blocks of the stripe. A RAID 4 architecture, however, suffers from limited write (i.e., the operation of writing to disk) performance because the parity disk is burdened with all of the parity update activity.

A RAID 5 architecture provides the same parity-based error correction as RAID 4, but improves "write" performance by distributing the data and parity across all of the available disk drives. A first stripe is configured in the same manner as it would be in RAID 4. However, for a second stripe, the data blocks and the parity block are distributed differently than for the first stripe. For example, if N+1 equals 5 disks, the parity block for a first stripe may be on disk 5 whereas the parity block for a second stripe may be on disk 4. Likewise, for other stripes, the parity disks are distributed over all disks in the array, rather than in a single dedicated disk. As such, no single storage unit is burdened with all of the parity update activity.

A RAID 6 architecture is similar to RAID 5, with increased fault tolerance provided by independently computed redundancy information in a N+2 redundancy group. A seventh RAID architecture, sometimes referred to as "RAID 0", provides data striping without redundancy information. Of the various RAID levels specified, RAID levels 0, 1, 3, and 5 are the most commonly employed in commercial settings.

Other storage controllers do not provide RAID functionality and merely present the host system with access to multiple disks in an enclosed array (often referred to as a JBOD or "Just a Bunch Of Disks"), without providing the virtual disk functionality. When a JBOD is connected via a SCSI bus, for example, each disk is addressed with both a SCSI Target ID and at least one LUN. Such storage controllers do not provide RAID functionality, but are intended primarily to provide access to multiple disks and to monitor the environment within a disk array enclosure.

Invariably, the data storage needs of a business tend to grow over time. A data storage solution that initially seemed adequate can become severely inadequate over time, particularly in terms of storage capacity, performance, and functionality. As a result, users typically wish to upgrade or enhance their data storage systems, preferably without completely losing their capital investment in the components of the original data storage configuration. It is therefore desirable to reuse components of an original data storage configuration in an upgraded data storage configuration. Additionally, users would benefit from an upgrade that does not require backing up data from existing arrays in the storage system and restoring the data to the upgraded storage system with the additional capacity.

SUMMARY OF THE INVENTION

The present invention provides advantages over existing upgradeable storage system. An embodiment of the present invention consolidates existing arrays and controllers behind a single entity, which has been shown to decrease the cost of ownership over the life of the storage system. Additional performance may also be achieved by incorporating an enhanced storage controller device, preferably including a larger cache, a faster processor, and/or a higher bandwidth bus than the original storage controller devices. In addition, the enhanced storage controller can provide additional channels to a larger drive group, which can also increase performance. Enhanced storage controllers can provide additional functionality, such as back up capabilities, higher levels of RAID, and hierarchical storage management (HSM). The transition to an upgraded system can also provides data consistency with the previous configuration (i.e., preserving the logical volumes presented to the host system), while automatically expanding to take advantage of additional capacity, performance, and functionality.

An embodiment of the present invention provides a method of upgrading a first data storage system into an enhanced data storage system., The first data storage system is operatively connected to a host system via a host bus and includes a first storage array controller device and a first storage array. The first storage array controller device presents to the host system a first logical volume mapping associated with a logical identifier, which maps to a physical data set stored in individual storage devices in the first storage array. The first storage array controller device is disconnected from the host bus. A second storage array is operatively connected to a storage connection device. An enhanced storage array controller device is operatively connected to the host system via the host bus.

The first storage array controller device and the storage connection device are operatively connecting to the enhanced storage array controller device via an intermediate bus. The physical data set of the first storage array is redistributed across a plurality of storage arrays, including the first and the second storage arrays. The enhanced storage array controller device is reconfigured to present a second logical volume mapping associated with the logical identifier mapping to the physical data set redistributed across the plurality of storage arrays.

Another embodiment of the present invention provides an upgraded data storage system coupled to a host system via a host bus. A first storage array stores a physical data set on individual storage devices. A first storage array controller device presents a first logical volume mapping associated with a logical identifier and mapped to the physical data set. The first storage array controller is configured to pass through communications in a one-to-one correspondence between the enhanced storage array controller device and individual disks in the first storage array. An enhanced storage array controller is operatively connected to the host system via the host bus and presents a second logical volume mapping associated with the logical identifier and mapped to the physical data set. An intermediate bus operatively connects the first storage array controller to the enhanced storage array controller.

These and various other features as well as advantages that characterize the invention will be apparent from a reading of the following detailed description and a review of the associated drawings.

DETAILED DESCRIPTION OF THE INVENTION

Figure 1:
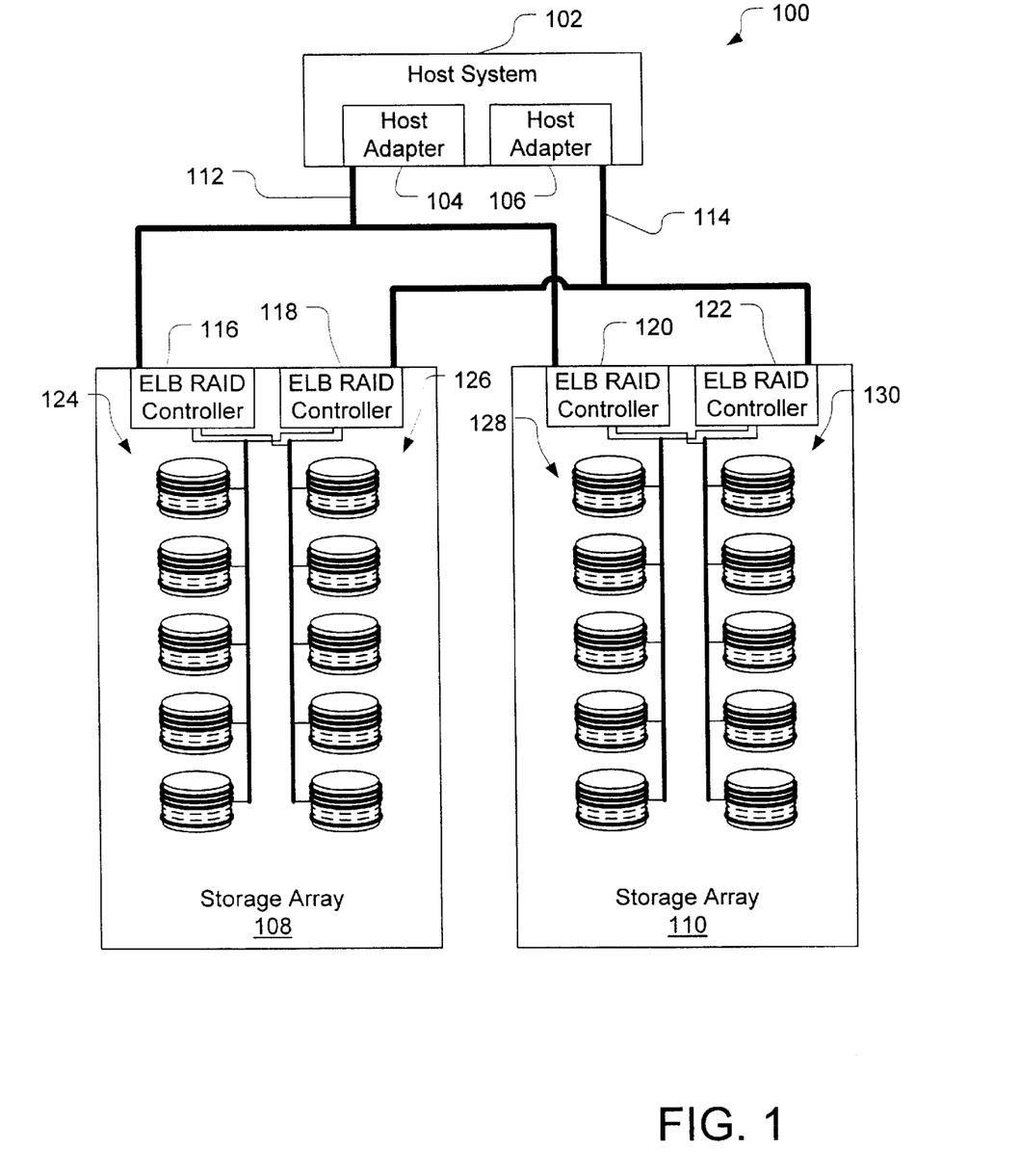
FIG. 1 illustrates an original data storage system in an embodiment of the present invention.

FIG. 1 illustrates an original data storage system 100 in an embodiment of the present invention. A host system 102 is coupled by host adapters 104 and 106 to an entry level bridge storage arrays 108 and 110 by host buses 112 and 114. While the host system 102 is preferably a personal computer (or "PC" type) or server computer system, it should be clearly understood that the present invention is equally suitable for use with other computing environments not specifically disclosed herein including mainframe computers and minicomputers. In a preferred embodiment, the host system includes at least one x86 microprocessor and acts as a server in a distributed computing environment. The host buses 112 and 114 are preferably well-known SCSI buses. Alternatively, other bus architectures may be employed in embodiments of the invention, including without limitation fiber channel or PCI (Peripheral Component Interconnect).

Entry level bridge (ELB) RAID controllers 116, 118, 120 and 122, represent low end RAID controllers operatively connecting a host adapter (e.g. host adapter 104) to a storage array, such as storage array 108. Intervening devices or interconnections may also be disposed between the host adapter and the storage array. In an alternative embodiment, each ELB RAID controller in the original data storage system may be replaced with PCI RAID controllers or other low end RAID controllers, wherein buses 112 and 114 are compatible with the low end RAID controller and host adapter.

In the illustrated embodiment of FIG. 1, RAID controller 116, for example, preferably provides a level of RAID functionality, disk caching, and environmental monitoring. The RAID controller 116 presents its own volumes to the host adapter 104 and maps logical unit numbers (LUN) appropriately to the data stored in storage array 108. In a typical scenario, the ELB RAID controller 116 "stripes" a volume across all five storage disks of disk arrays 124 and 126 to provide RAID 0 functionality. RAID controller 118 presents volumes mapped to disk arrays 124 and 126 to provide dual access to the storage arrays. In a similar manner, the ELB RAID controller 120 presents volumes mapped to disk arrays 128 and 130. The ELB RAID controller 122 also presents volumes mapped to disk arrays 128 and 130.

Alternatively, such as in a fiber channel embodiment, the drives in storage arrays 124 and 126 are preferably dual-ported. As such, both controllers 116 and 118 may be connected to all of the drives in the storage arrays 124 and 126, or alternatively, each controller may be connected independently to a subset of the drives in the storage arrays 124 and 126.

FIG. 1 also illustrates an example of redundant channels. That is, a drive in array 126 may be accessed via either controller 116 or 118. Therefore, if one or the other controller fails, a host system may still access the drive through the remaining controller. In an alternative embodiment of the present invention, a storage array that lacks such channel redundancy may be incorporated into an upgraded storage system that supports channel redundancy. That is, the data in the original storage array can be reconfigured (e.g., redistributed and remapped) throughout the added capacity of the upgraded storage system to provide channel redundancy to the data that was initially stored in the original storage array. See the discussion of FIG. 3 for more information.

In the original data storage system of FIG. 1, the host system 102 has access to four disk arrays (i.e., 124, 126, 128, and 130) via entry level bridge RAID controllers (i.e. 116, 118, 120, and 122) to obtain storage capacity, data storage performance, and RAID functionality. However, while the configuration illustrated in FIG. 1 may have met a user's original requirements, as the user's needs increase in terms of storage capacity, performance, and/or RAID functionality, a user may find the original data storage system 100 inadequate.

A user in such a situation has several alternatives. First, for example, a user may add additional disk drives to one or more of the disk arrays in order to increase storage capacity. Furthermore, employing a feature called Dynamic Capacity Expansion (DCE), the user can automatically reconfigure the data on the original disks of a storage array, distributing it across both the original storage disks and the added storage disks. After reconfiguration, all data is distributed evenly across all storage disks in the storage array, while the RAID controller continues to present the same logical volumes to the host system. Likewise, all unused capacity appears evenly distributed across all drives following the last LUN. Therefore, unused capacity may be used to create additional LUNs. Generally, DCE is limited by the maximum number of storage disks a particular RAID controller can support and by the number of channels available to access the plurality of storage disks in the array.

In addition, a user may upgrade from a lower RAID level (e.g., RAID 0) to a higher RAID level for a particular LUN using Dynamic RAID Migration (DRM), which causes the LUN to be automatically reconfigured such that the data is re-mapped according to the definition of the new RAID level. Unfortunately, if the upgrade is to a RAID level not supported by the ELB RAID controller or PCI RAID controller in the disk array, it must be replaced by a RAID controller with higher levels of functionality. To accommodate such upgrades without requiring replacement of the existing RAID controllers, the ELB RAID controllers 116, 118, 120, and 122 of FIG. 1 include a settable pass-through mode, which disables all or a portion of the controller's RAID functionality and presents a one-to-one correspondence between the LUNs presented to the host bus (e.g., 112 and 114) and the physical storage disks in the disk array. In FIG. 1, controllers 116, 118, 120, and 122 are not set in pass-through mode, but are set to provide RAID functionality.

Figure 2:
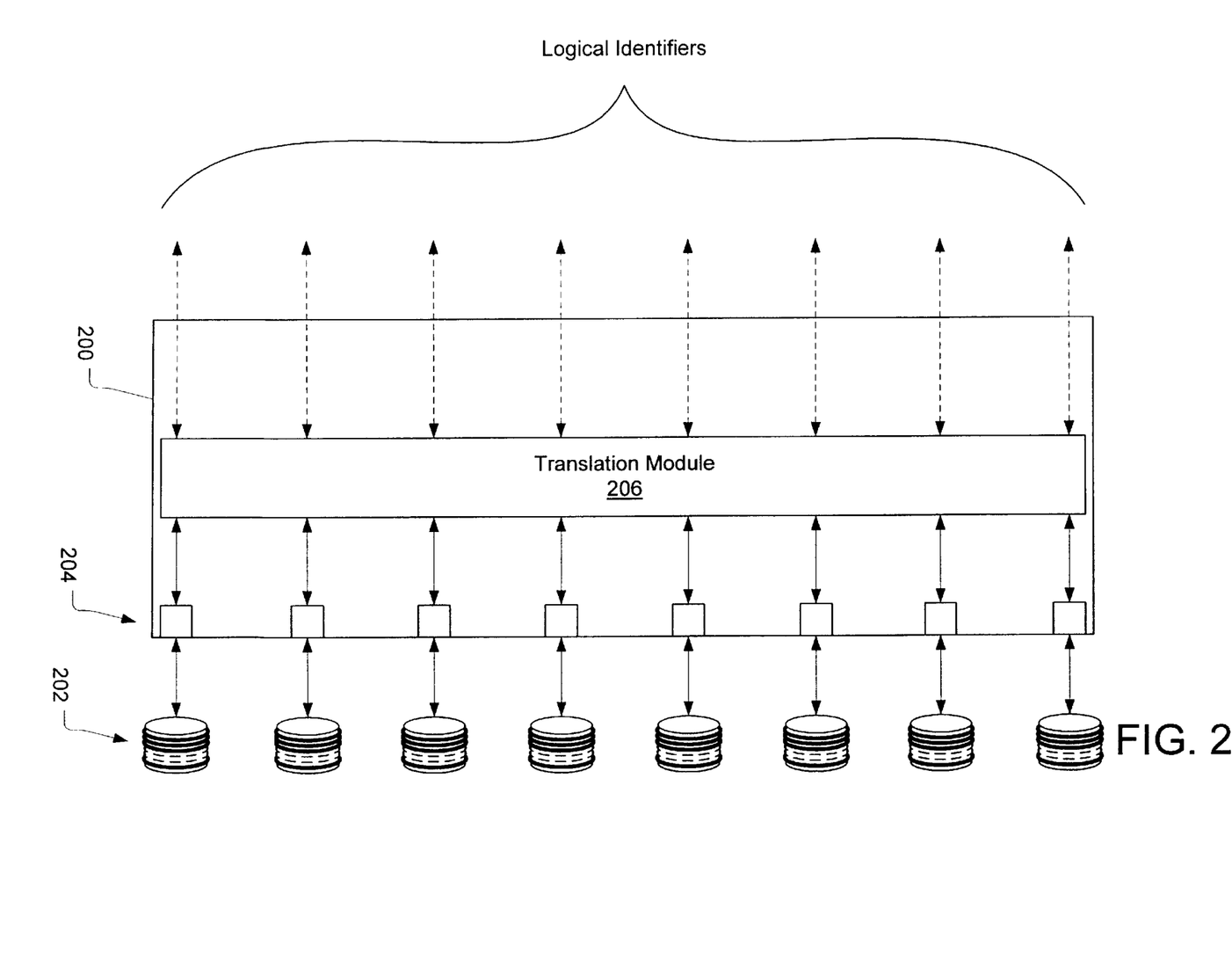
FIG. 2 illustrates a logical diagram of a storage array controller device configured in pass-through mode in an embodiment of the present invention.

FIG. 2 illustrates a storage array controller device 200 configured in pass-through mode in an embodiment of the present invention. As shown, storage disks, shown generally at 202, are coupled to storage controller ports, shown generally at 204, in a one-to-one correspondence. A translation module 206 is coupled to the ports 204 to translate target IDs associated with each of the storage disks 202 into logical identifiers (e.g., LUNs). The translation module 206 may also provide disk caching, mirroring, and environmental monitoring.

It should be understood that the volumes presented to the host system by the storage array controller 200 in the original data storage system are not the same logical units presented by the controller 200 in pass-through mode. In other words, in an embodiment of an original data storage system, LUN 0 consists of data striped across all of the storage disks 202, and LUN 1 consists of data in an alternative stripe across all of the storage disks 202. In contrast, when the storage array controller 200 is set to pass-through mode, LUN 0 is mapped to data on a single storage disk, and LUN 1 is mapped to data stored on a different single storage disk, as shown in FIG. 2. Accordingly, the underlying storage arrays appear as JBODs to an enhanced storage array controller coupling the original storage arrays to the host system in an upgraded data storage system. In pass-through mode, a storage array controller device acts as, and may be considered, a storage connection device.

Figure 3:
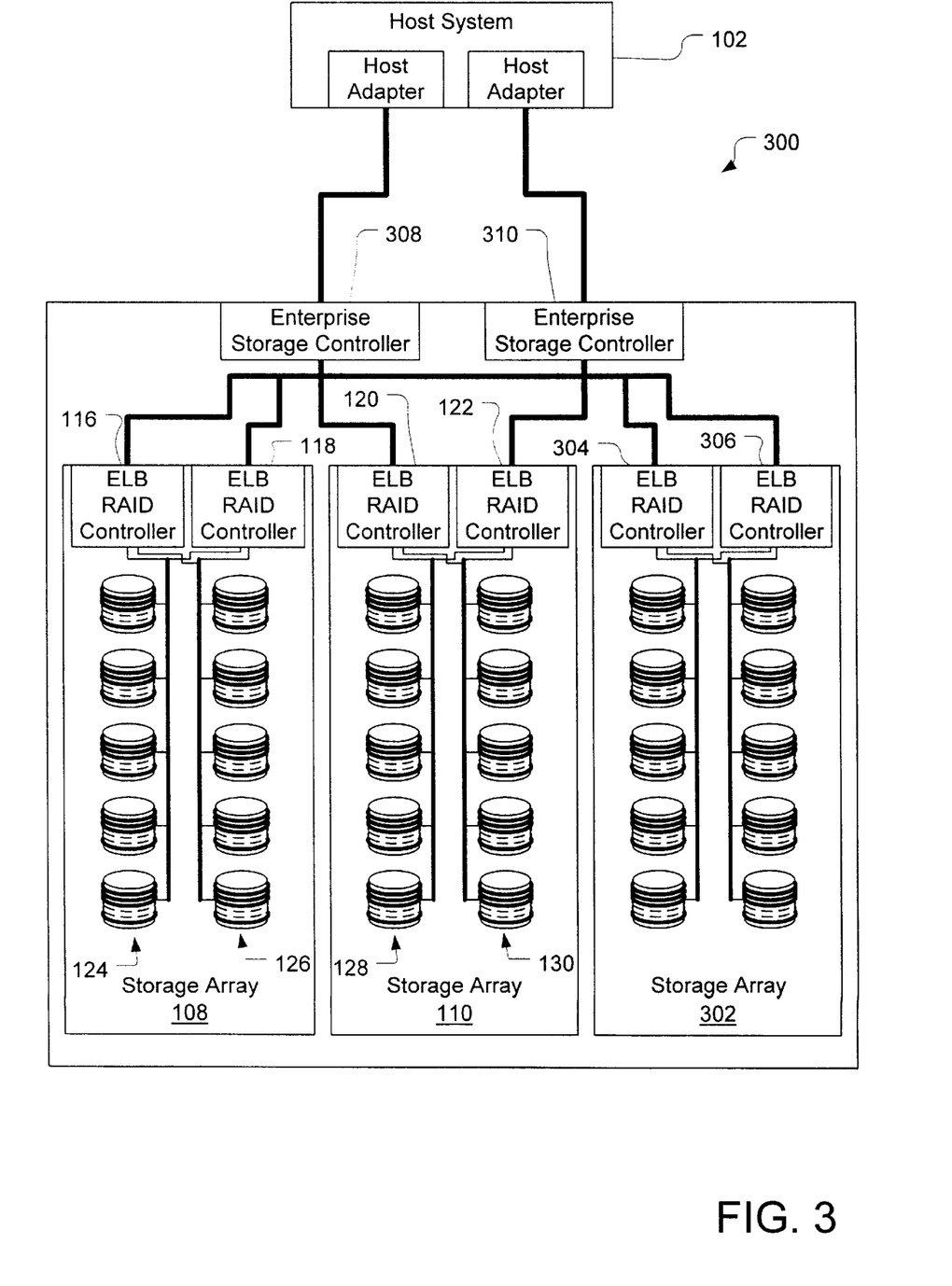
FIG. 3. depicts an upgraded data storage system in an embodiment of the present invention.

FIG. 3 depicts an upgraded storage system 300 in an embodiment of the present invention. The host system 102 with host adapters is preferably the same host system as in FIG. 1. Likewise, storage arrays 108 and 110 are preferably the same as those illustrated in FIG. 1, although the ELB RAID controllers 116, 118, 120 and 122 will be configured in pass-through mode. A third storage array 302 has been added to the original data storage system to provide added storage capacity and increased performance. The ELB RAID controllers 304 and 306 are coupled to the enterprise storage controllers 308 and 310 (i.e., enhanced storage array controllers), which may alternatively be any storage array controller with increased performance, increased channel capacity, or increased storage management functionality (e.g., RAID management or data management) over the ELB RAID controllers. The ELB RAID controllers 116, 118, 120 and 122, from the original data storage system, are disconnected from the host system and are also connected to the enterprise storage controllers 308 and 310, which are coupled to the host system 102.

After the new storage array 302 and enterprise storage controllers 308 and 310 are added to the original data storage system, there exists new capacity and additional channels that can be used to optimize the performance of the upgraded storage system 300. As a result, when the additional capacity is detected via an administration tool or by automatic means, the user or the host system itself issues a command to one or both of the enterprise storage controllers 308 and 310 commanding them to put the ELB RAID controllers into pass-through mode. An enterprise storage controller (such as 308) then reads metadata (i.e., configuration information)

from on-media storage called a Dacstore. Generally, a Dacstore records the logical mapping information corresponding to each storage device in the array, and is described in more detail in U.S. Pat. No. 5,822,782 to Humlicek et al., specifically incorporated herein for all that it discloses and teaches.

Figure 5:
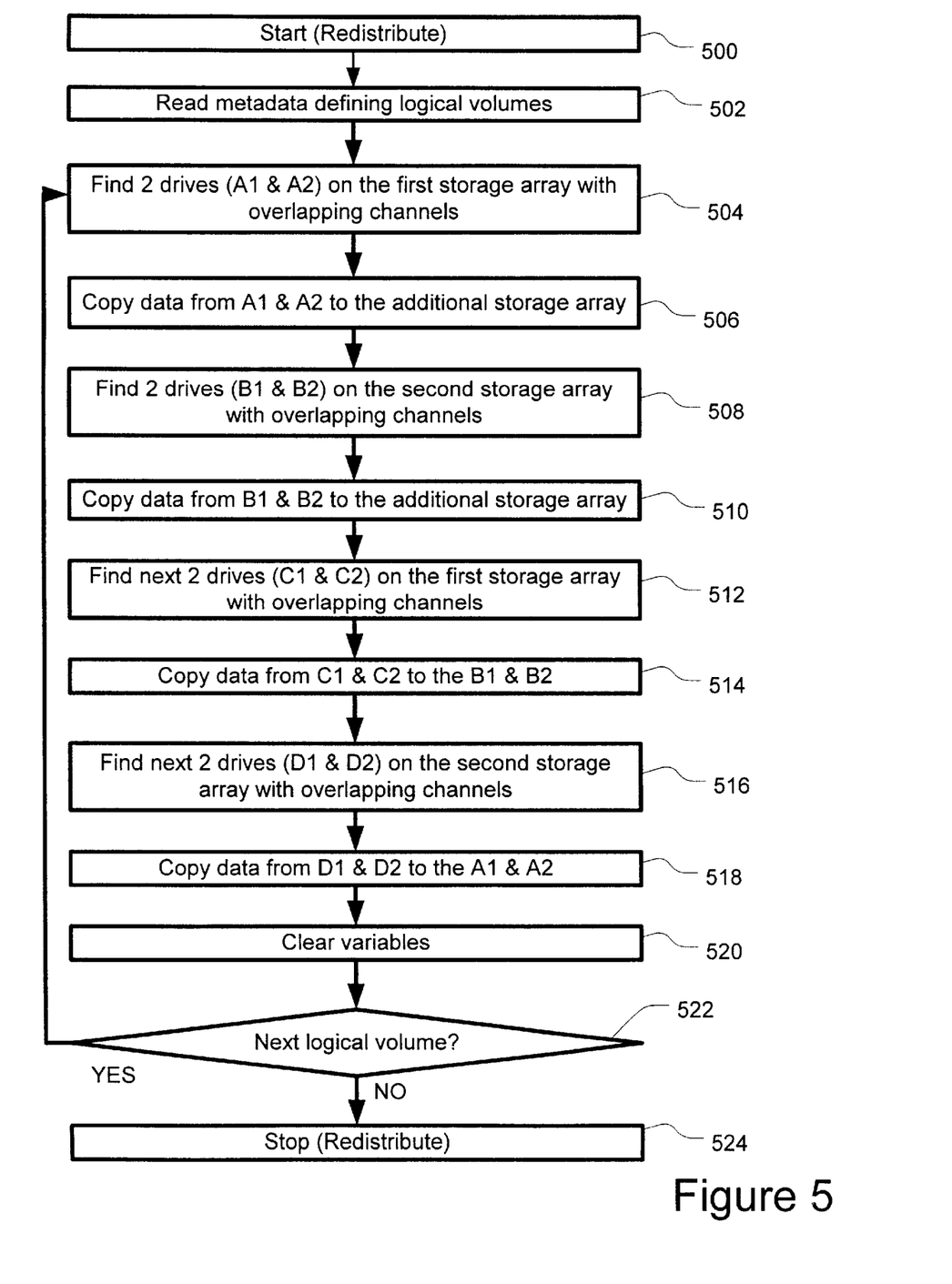
FIG. 5 depicts a flowchart of operations for redistributing data from two existing ELB storage arrays with an additional storage array in an embodiment of the present invention.

Using the metadata information, the enterprise storage controller reconstructs the logical mappings of volumes stored in and presented to the host system in the original data storage system. After reading the metadata from each storage disk, the enterprise storage controller reconfigures the data stored in the original data storage system so as to distributed it evenly throughout the existing storage capacity in the upgraded data storage system 300. A method for reconfiguring data for a six channel storage array controller in which channel redundancy is required for the upgraded data storage system is illustrated in FIG. 5.

The embodiments illustrated in FIGS. 1 and 3 include two dual-channel storage arrays with ELB RAID controllers upgraded to 3 dual channel-storage arrays with ELB RAID controllers configured in pass-through mode and coupled behind two enterprise storage controllers. Other configuration upgrades are contemplated in other embodiments of the present invention, including for example a single-channel storage array controller being supplemented by a second single-channel storage array controller behind a higher channel capacity storage controller. Importantly, the pass-through relationships presented by the original controller or controllers facilitate the reconfiguration performed by the enhanced storage array controller by presenting the storage devices in the underlying arrays as a JBOD.

The redistribution and remapping of the data in a drive group also provides an upgrade path from an original storage system that lacks channel redundancy to an upgraded storage system that accommodates channel redundancy. Assuming, for example, that the original storage array 108 did not provide channel redundancy, the volume data can be redistributed and remapped such that enterprise storage controllers 308 and 310 can provide the redundant paths to the data for a particular volume.

Figure 4:
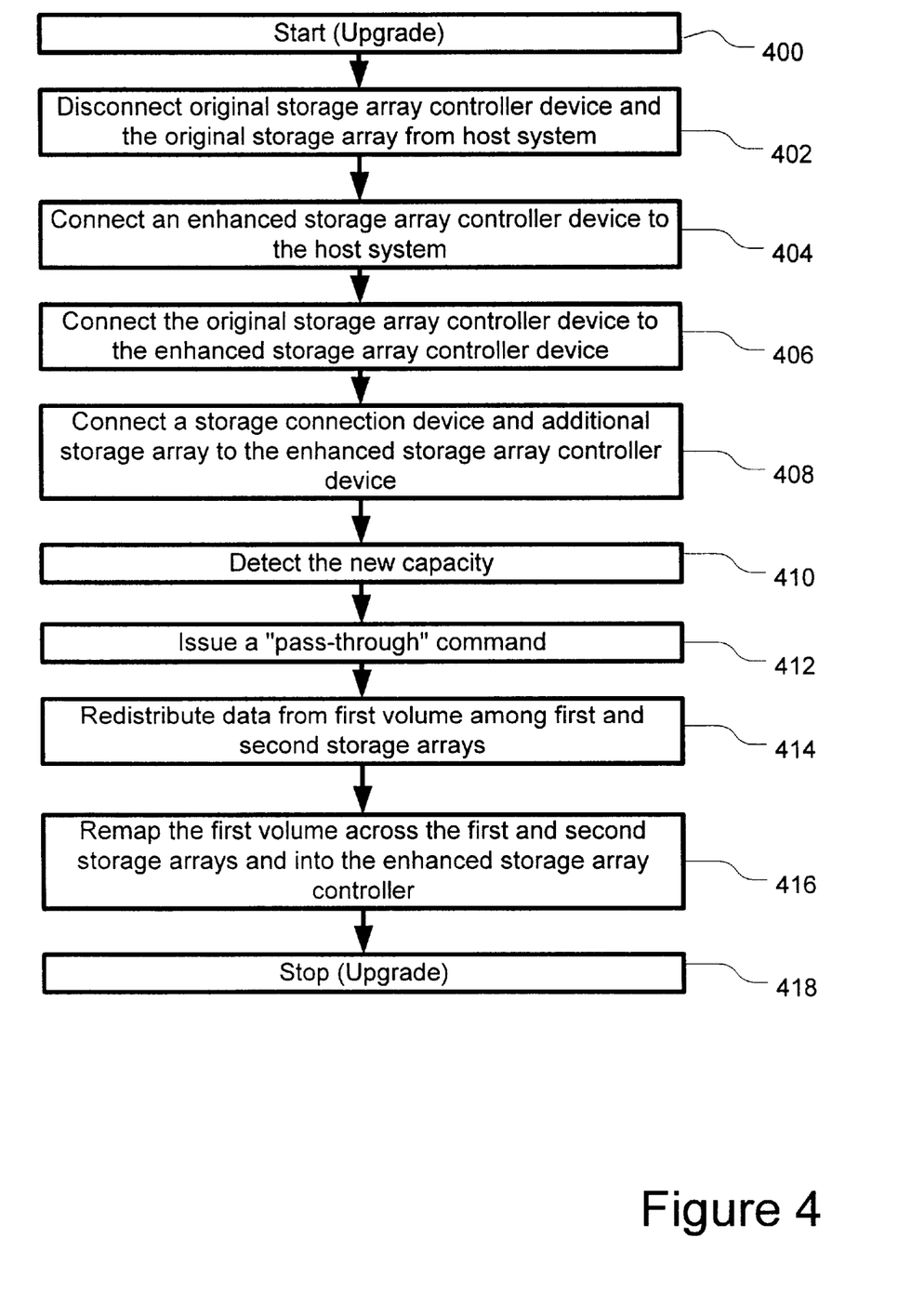
FIG. 4 illustrates a method of upgrading an original data storage system by adding more capacity in an embodiment of the present invention.

FIG. 4 illustrates a method of upgrading an original data storage system by adding more capacity in an embodiment of the present invention. It should be understood that it is not necessary to add capacity to upgrade an original data storage system. For example, additional channels may be added to an original data storage system to increase availability of existing storage. Alternatively, a higher level of RAID may be achieved by upgrading an original data storage system to entry level bridge RAID controllers to enterprise RAID controllers, for example.

Operation 400 starts the upgrade process. The process starts with an original storage array controller device connected to a host system. An original storage array is coupled through the original storage array controller device to a host system (see FIG. 1). It is understood that the original storage array controller device of FIG. 1 is configurable to support a pass-through mode. The original storage array stores metadata defining the configuration of the logical volume mappings in the storage array. In operation 402, the original storage array controller device and the original storage array are disconnected from the host system. Operation 404 connects an enhanced storage array controller device to the host system. Preferably, the enhanced storage array controller device includes at least one of an increased number of disk channels, higher performance capability, or increased RAID functionality. In operation 406, the original storage array controller device (and the original storage array) is connected to the enhanced storage array controller device. Operation 408 connects a storage connection device and an additional storage array to the enhanced storage controller device. The storage connection device may include without limitation a storage array controller device set in pass-through mode, a PCI RAID controller device set in pass-through mode, or an environmental services monitor (ESM).

In operation 410, the enhanced storage array controller device detects the new capacity provided by the additional storage array through the storage connection device. Alternatively, instead of automatic detection of new capacity, the enhanced storage array controller device may receive a command from the host system to initiate a reconfiguration process. In operation 412, the enhanced storage array controller device issues a command to the original storage array controller device, and to the storage connection device, if necessary. The command of operation 412 causes the original storage array controller device (and the storage connection device, if necessary) to be configured in pass-through mode. In operation 414, the enhanced storage array controller device copies data from what was the first volume presented to the host system by the original storage array controller device across the first and second storage arrays. In operation 416, the enhanced storage array controller device re-maps the first volume that was presented by the original storage array controller device to the host system to the data that is now redistributed across the first and second storage arrays, so that the enhanced storage array controller device presents the same first volume and corresponding data to the host system. Operations 414 and 416 are preferably iterative, copying disks across non-overlapping channels and then remapping the volume data on these disks. Operations 414 and 416 are performed so as not to interfere with the I/O (input/output) operations from a host system. The process stops in operation 418, however, if additional volumes were presented by the original storage array controller device, the enhanced storage array controller device may also have reconfigured these volumes across the available storage capacity.

FIG. 5 depicts a flowchart of operations for redistributing data from two existing ELB storage arrays when an additional storage array is added in an embodiment of the present invention. The original data storage system is assumed to be similar to that as shown in FIG. 1. In operation 500, the redistribution process starts, preferably in reaction to a detection of added storage capacity from an additional storage array or to a host command. In operation 502, the enhanced storage array controller device reads the metadata from the original storage arrays to determine the logical volume mappings supported by the storage arrays.

For each drive group, the enhanced data storage array controller device in operation 504 locates the first two storage devices (i.e., A1 and A2) of the first storage array (e.g., storage array 108 in FIG. 1) having overlapping channels with respect to the other storage devices in the drive group. An "overlapping channel" refers to a single channel coupled to multiple drives in the same drive group. In operation 506, the enhanced storage array controller device copies the data on the storage devices A1 and A2 on different channels to the additional storage array. The two devices A1 and A2 in the first storage array are now available to store new data.

In operation 508, the enhanced storage array controller device locates the first two storage devices B1 and B2 on the second storage array (e.g., storage array 110 in FIG. 1) having overlapping channels in the storage array with respect to the other storage devices in the drive group. In operation 510, the enhanced storage array controller copies the data on the storage devices B1 and B2 on different channels to the additional storage array. The two devices B1 and B2 in the second storage array are now available to store new data.

In operation 512, the enhanced storage array controller device locates the next two storage devices C1 and C2 on the first storage array having overlapping channels in the storage array with respect to the other storage devices in the drive group. In operation 514, the enhanced storage array controller copies the data on the storage devices C1 and C2 on different channels to the storage devices B1 and B2. The two devices C1 and C2 in the first storage array are now available to store new data.

In operation 516, the enhanced storage array controller device locates the next two storage devices D1 and D2 on the second storage array having overlapping channels in the storage array with respect to the other storage devices in the drive group. In operation 518, the enhanced storage array controller copies the data on the storage devices D1 and D2 on different channels to the storage devices A1 and A2. The two devices D1 and D2 in the second storage array are now available to store new data.

Note that the drive groups and corresponding storage disks are defined by the metadata stored on a reserved region of each storage disk. Furthermore, because the enhanced storage array controller device has set each of the original storage array controller devices into pass-through mode, the enhanced storage array controller device can access each storage device in the storage array in a one-to-one correspondence. That is, for example, the enhanced storage array controller device sees each storage device in the storage array as an individual LUN for each target identifier or as a set of individual target identifiers, in the case of an ESM.

After operations 504 through 518 are completed, the identifiers A1 and A2, B1 and B2, C1 and C2, and D1 and D2, are reset for iteration through the next drive group in operation 520. If on any of the above steps no two drives whose positions overlap the channels of the other drives in the drive group, the copy operation is performed on the single found drive, if possible. If no drives overlap, the operation is skipped. If additional volumes exist, operation 522 directs process to 504 to repeat the process for the additional volumes. Otherwise, the redistribution process terminates at operation 524.

Figure 6:
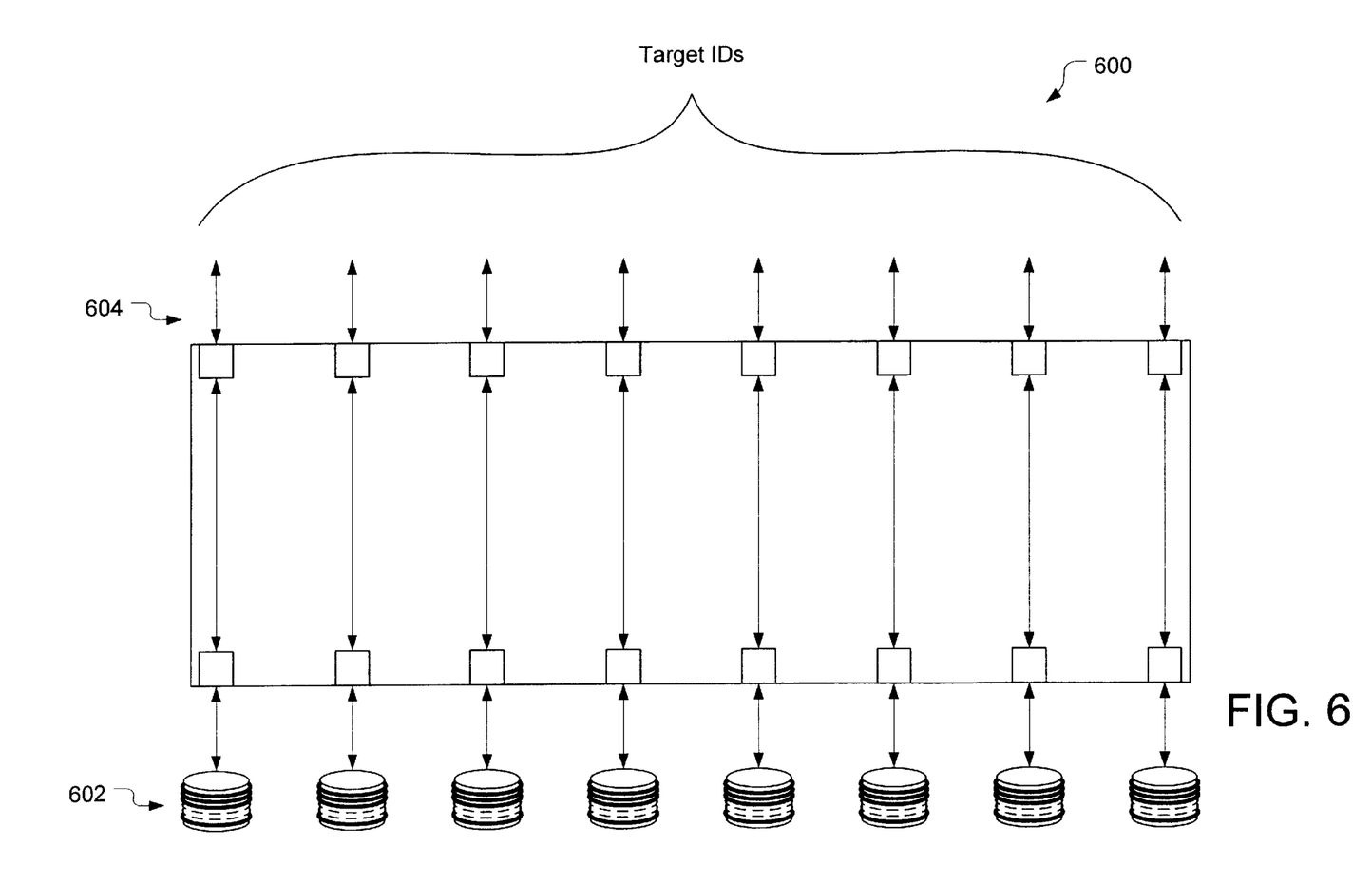
FIG. 6 illustrates a logical diagram of an environmental services monitor (ESM) providing pass-through relationships in an embodiment of the present invention.

FIG. 6 illustrates pass-through relationships provided by an ESM 600 in an embodiment of the present invention. Individual storage devices 602 correspond to individual target identifiers on the storage array side of the ESM. Internally, the individual target identifiers are physically mapped to individual target identifiers on the host system (or enhanced storage array controller) side of the ESM (shown generally at 604), providing a one-to-one relationship to each individual storage device. In an original data storage system, the side 604 of the ESM is preferably connected to a host system via a SCSI, PCI, or fiber channel bus. For example, on a SCSI bus, each target identifier is a SCSI Target ID on the SCSI bus. Alternative interconnections are contemplated in other embodiments of the present invention. In an upgraded data storage system, the side 604 of the ESM is preferably connected to an enhanced storage array controller device, which is connected to the host system to provide upgraded capacity, performance, or RAID functionality, It is also to be understood that an ESM is used as a storage connection device to couple the additional storage array to the enhanced storage array controller.

Figure 7:
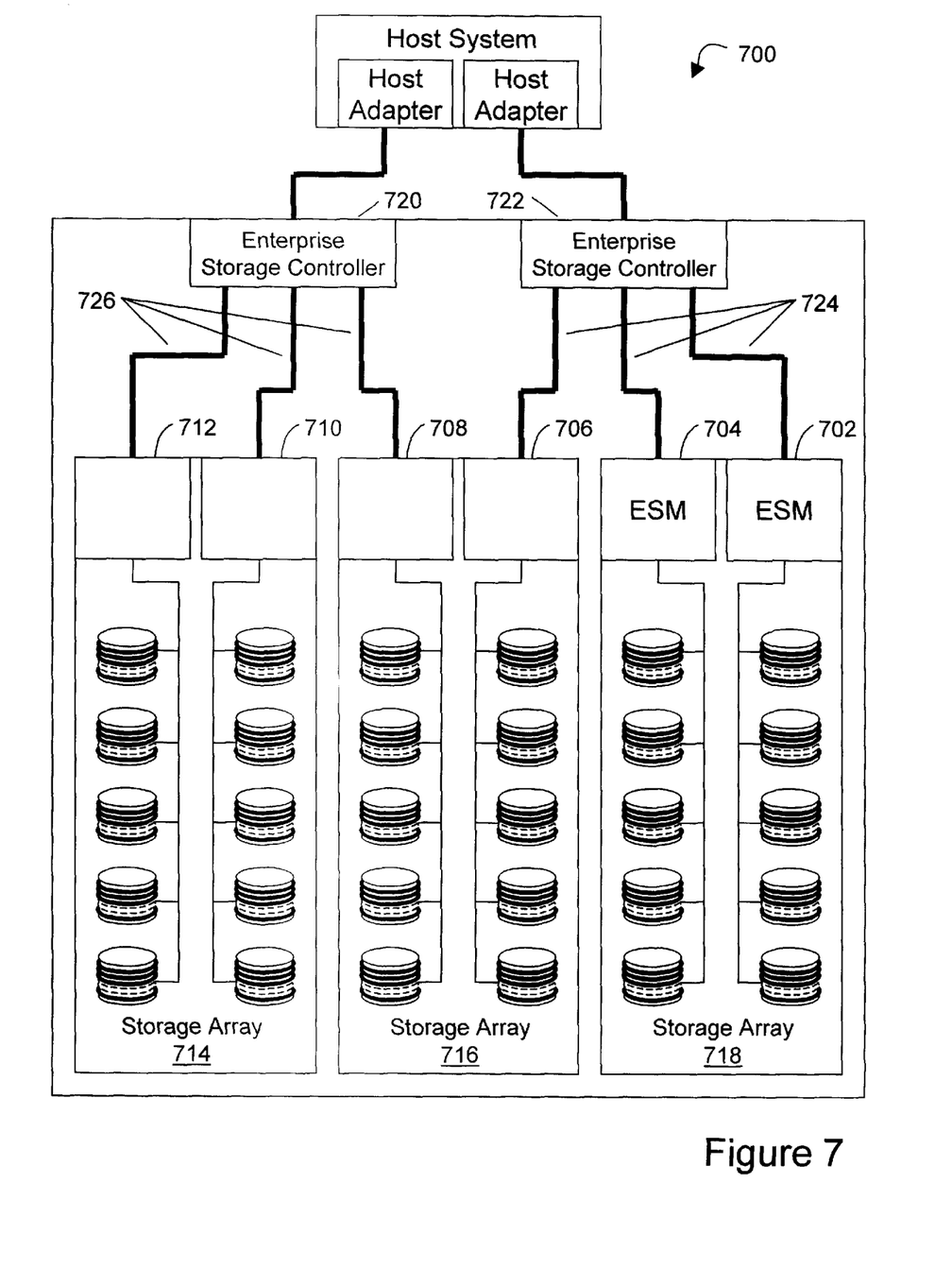
FIG. 7 illustrates an upgraded data storage system including one or more ESMs in an embodiment of the present invention.

FIG. 7 illustrates an upgraded data storage system including one or more ESMs in an embodiment of the present invention. Storage arrays 714 and 716 represent storage arrays from the original data storage system. In one embodiment of the present invention, the devices 712, 710, 798, and 706 include entry level bridge RAID controllers or other storage array controllers used in the original data storage system and configured to provide pass-through relationships to the enterprise controllers 720 and 722. Alternatively, the storage array controllers used in the original data storage system are replaced with ESMs and reused in other data storage systems. In either embodiment, the devices 702, 704, 706, 708, 710, and 712 provide pass-through relationships to storage devices in the underlying storage arrays. Devices 702,704 and 706 are connected to enterprise storage controller 722 through disk channels 724. Devices 708,710, and 712 are connected to enterprise storage controller 720 through disk channels 726.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of upgrading a data storage system into an enhanced data storage system, said data storage system including a first storage array controller device operatively connected to a host system and to a first storage array, the method comprising:

interposing an enhanced storage array controller between said first storage array controller and said host system;

operatively connecting a second storage array to a storage connection device;

operatively connecting said storage connection device to said enhanced storage array controller;

redistributing data from said first storage array across a plurality of storage arrays, including said first storage array and said second storage array; and providing a logical to physical map operative to access data redistributed across said plurality of storage arrays.

2. The method of claim 1 further comprising:

configuring said first storage array controller to operate in a pass-through mode whereby individual devices in the first storage array may be accessed by said enhanced storage array controller.

3. The method of claim 2 wherein said step of configuring said first storage array controller to operate in a pass-through mode further comprises:

configuring said first storage array controller to map individual storage devices in said first storage array to logical identifiers in a one-to-one correspondence.

4. The method of claim 1 wherein said storage connection device further comprises:

an environmental services monitor connecting the individual storage devices of said second storage array to said enhanced array controller wherein said environmental services monitor is configured in a pass-through mode.

5. The method of claim 1 wherein said storage connection device comprises a second storage array controller operating in pass-through mode.

6. The method of claim 1 wherein said enhanced array controller provides more disk channels than said first storage array controller.

7. The method of claim 1 wherein said enhanced array controller provides a higher level of RAID functionality than said first storage array controller.

8. The method of claim 1 further comprising:
storing information describing mapping of redistributed data on a storage device contained in said first and second storage arrays.

9. A method for upgrading a data storage system, said data storage system including a storage array controller operatively connected to a host system and to a storage array, the method comprising:
interposing an enhanced array controller between said storage array controller and said host system;
configuring said storage array controller to operate in pass-through mode; and
creating a logical to physical map operative to allow said enhanced storage array controller to access the physical data set stored in said storage array.

10. The method of clam 9 wherein said enhanced array controller provides a higher level of RAID functionality than said storage array controller.

11. The method of claim 10 wherein said step of configuring said storage array controller further comprises:
configuring said storage array controller to map drives in said storage array to logical identifiers in a one-to-one correspondence.

12. An upgraded data storage system comprising:
an enhanced storage array controller coupled to a host system;
a storage array controller coupled to said enhanced storage array controller wherein said storage array controller is configured to operate in a pass-through mode; and
a storage array coupled to said storage array controller wherein said enhanced storage array controller is configured to access physical data in said storage array associated with a logical identifier.

13. The upgraded data storage system of claim 12 further comprising:
a second storage array controller coupled to said enhanced storage array controller; and
a second storage array coupled to said second storage array controller, wherein said enhanced storage array controller is configured to access a physical data set distributed across a plurality of storage arrays, including said storage array and said second storage array.

14. The upgraded data storage system of claim 13 wherein said storage array further comprises:
configuration data recorded in at least one individual disk within said storage array and said second storage array.

15. The upgraded data storage system of claim 12 wherein said storage array controller is replaced by a connection device configured to operate in a pass-through mode.

16. The upgraded data storage system of claim 12 wherein said storage array controller is replaced by means for passing-through communications in a one-to-one correspondence between said enhanced storage array controller and individual disks in said storage array.

17. An upgraded data storage system coupled to a host system via a host bus, the upgraded data storage system comprising:
a first storage array including first individual storage devices;
a storage array controller that has been configured in accordance with said upgraded data storage system to pass though communications in a one-to-one correspondence to and from said first individual storage devices in said first storage array;
a second storage array including second individual storage devices; and
an enhanced storage array controller operatively connected to said host system via said host bus, said enhanced storage array controller configuring a physical data set across both said first storage array and said second storage array to logically map said physical data across both said first storage array and said second storage array.

18. The upgraded data storage system of claim 17 further comprising:
configuration data recorded on one or more individual storage devices within said first storage array and said second storage array.

19. The upgraded data storage system of claim 17 wherein data stored solely in said first data storage array lacks channel redundancy, and data stored across both said first storage array and said second storage array is channel redundant.

* * * * *